(12) United States Patent
Wolf et al.

(10) Patent No.: US 8,894,072 B2
(45) Date of Patent: Nov. 25, 2014

(54) BARRIER SEAL

(76) Inventors: Wayne Alan Wolf, Kelowna (CA);
Roger David Scott Goldammer, Kelowna (CA)

( * ) Notice: Subject to any disclaimer, the term of this patent is extended or adjusted under 35 U.S.C. 154(b) by 0 days.

(21) Appl. No.: 13/488,378

(22) Filed: Jun. 4, 2012

(65) Prior Publication Data

US 2014/0062038 A1    Mar. 6, 2014

(51) Int. Cl.
*F16J 15/32*    (2006.01)

(52) U.S. Cl.
USPC .......................................... 277/642; 277/644

(58) Field of Classification Search
USPC .......... 277/637, 639, 642, 644, 645, 648, 649
See application file for complete search history.

(56) References Cited

U.S. PATENT DOCUMENTS

| | | | | |
|---|---|---|---|---|
| 2,330,220 A * | 9/1943 | Kemper | ........................ | 220/239 |
| 2,841,429 A * | 7/1958 | McCuistion | .................. | 277/402 |
| 5,246,236 A * | 9/1993 | Szarka et al. | ................. | 277/337 |
| 6,053,666 A * | 4/2000 | Irvine et al. | .................... | 405/279 |
| 6,357,702 B1 * | 3/2002 | Richter | ........................... | 248/55 |

* cited by examiner

*Primary Examiner* — Gilbert Lee
(74) *Attorney, Agent, or Firm* — Richard D. Okiman

(57) ABSTRACT

A seal, system and method for sealing a connection between adjacent barrier members each having a channel along one edge and flange along an opposed edge sized to be received within a corresponding channel of an adjacent barrier member. The seal comprises an elongate core having an opening extending longitudinally therealong and a plurality of fins extending therefrom. The system includes the seal and a wiper sized to surround the flange. The method comprises locating the wiper about the flange and the seal within the channel, engaging the flange within the channel and moving the second barrier member in a downward direction with the wiper below the channel of the second barrier member so as to remove and prevent debris from entering the connection between the channel and the flange.

13 Claims, 7 Drawing Sheets ion there is disclosed a system for sealing a connection

BARRIER SEAL

BACKGROUND OF THE INVENTION

1. Field of Invention

The present invention relates to seals in general and in particular a method and system for sealing barrier interconnections.

2. Description of Related Art

In the field of geotechnical engineering, it is frequently necessary to physically isolate one area in a soil formation from an adjacent area for a variety of purposes. These purposes may include providing either a temporary or a permanent retaining wall, or may be for the purpose of isolating contaminants in one of those areas of soil from the other. One known method of providing such isolation is to insert successive panels into the soil formation between the two areas so as to form a continuous barrier therebetween. In the case of remediation work where the purpose is to contain and remove contaminants from the soil of one of the areas, it is frequently necessary to ensure that the barrier created by such panels does not have significant gaps therebetween which may allow the contaminants to escape.

One common method of inserting such panels into the ground is to vertically orient the panel above the surface of the soil formation and apply sufficient pressure to the top of the panel so as to forcibly insert the panel into the soil formation. Successive panels may be thereafter similarly inserted into the soil formation with a slidable interconnection between the two adjacent panels to assure continuity.

A difficulty with present methods of inserting remediation panels into soil formations is the difficulty of sealing the interconnection therebetween. However, conventional methods have not been sufficient to resist inclusion of dirt and debris during the process of installing the adjoining plates. In addition, conventional seals, have not provided sufficient sealing capabilities for such demanding environments.

SUMMARY OF THE INVENTION

According to a first embodiment of the present invention there is disclosed an method of sealing interconnections between adjacent panel members in a barrier. The method comprises locating a first barrier member within a soil formation having a first barrier interconnection at a first edge thereof, applying a seal within the second connection, the seal having an interior cavity and a sensor within the cavity. The method further comprises locating a sensor protector about the first connector below the second connector, the sensor protector having an extended member adapted to close an open end of the cavity. The method further comprises locating a wiper co-axially with the sensor protector about the first connector and moving second connector in a downward direction with the sensor protector and wiper below the second connector so as to remove and prevent debris from entering the connection between the first and second connectors and the cavity.

According to a further embodiment of the present invention there is disclosed a system for sealing a connection between adjacent barrier members. Each barrier member has a first edge defining a first connector and an opposed second edge defining a second connector. The second connector is adapted to co-operatingly engage a corresponding first connector of an adjacent barrier member. The system comprises a seal locatable within the second connector having a cavity therein sized to receive a sensor. The system further comprises a sensor protector adapted to be received co-axially with the second connector over the first connector. The sensor protector having an extend portion sized and located to be received within the cavity of the seal so as to close an open end thereof. The system further comprises a wiper adapted to surround the first connector co-axially with the slidable shoe and second connector so as to remove debris from adjacent thereto. The wiper may have an angled wall at a bottom edge thereof.

According to a further embodiment of the present invention there is disclosed a seal comprising a central core, and a plurality of fins extending therefrom.

The central core having a central cavity extending therealong connected to an exterior of the seal by a slot. The plurality of fins comprising a first opposed pair of large fins and an associated opposed pair of small fins located inwardly of the large fins all located proximate to front surface of the central core. The plurality of fins further comprising a first opposed pair of large fins and an associated opposed pair of small fins located inwardly of the large fins all located proximate to rear surface of the central core.

According to a further embodiment of the present invention there is disclosed a seal for sealing an elongate member within an elongate channel. The seal comprises an elongate core having an opening extending longitudinally therealong and a plurality of fins extending longitudinally from the elongate core.

The opening may comprise a central cavity extending along a central axis of the elongate core connected to an exterior of the elongate core by a slot. The plurality of fins may extend substantially radially from the elongate core. The elongate core has a substantially rectangular cross-section. The elongate core may be substantially defined by first and second long sides having first and second short sides extending therebetween.

The plurality of fins may comprise long and short fins, wherein the long fins extend further from the elongate core than the short fins. The short fins may extend from corners of the long sides and the short sides of the elongate body. The long fins may extend from the short sides proximate to the short fins. The long and short fins may extend angularly from the elongate core. Each long fin may have a corresponding short fin. Each long fin may extend from the central core substantially parallel to its corresponding short fin. The seal may be formed of a substantially flexible material.

According to a further embodiment of the present invention there is disclosed a system for sealing a connection between adjacent barrier members, each barrier member having a first edge defining a channel and an opposed second edge defining a flange, the flange being sized and shaped to be slidably engaged within a corresponding channel of an adjacent barrier member. The system comprises a seal for sealing the flange within the channel comprising an elongate core having an opening extending longitudinally therealong and a plurality of fins extending longitudinally from the elongate core. The system further comprises a wiper sized to slidably and sealably surround the flange proximate to a bottom edge of the channel having a top edge abuttable against the channel for removing debris from adjacent to the flange.

The system may further include an edge protector comprising a body having a shape corresponding to the channel of the barrier members being locatable between the channel and the wiper and having an extend portion sized and located to be received within an open end the cavity of the seal located within the channel so as to close the open end of the cavity.

According to a further embodiment of the present invention there is disclosed a method of sealing interconnections between adjacent panel members in a barrier, each barrier member having a first edge defining a channel and an opposed second edge defining a flange, the flange being sized and shaped to be slidably engaged within a corresponding channel of an adjacent barrier member. The method comprises locating a first barrier member within a soil formation, slidably and sealably locating a wiper about the flange of the first barrier member and applying a seal within the channel of a second barrier member. The seal comprising an elongate core having an opening extending longitudinally therealong and a plurality of fins extending longitudinally from the elongate core. The method further comprises engaging the channel of the second barrier member with the flange of the first barrier member and moving the second barrier member in a downward direction with the wiper below the channel of the second barrier member so as to remove and prevent debris from entering the connection between the channel and the flange.

The method may further comprise locating an edge protector between the wiper and the channel of the second barrier member, the edge protector comprising a body having a shape corresponding to the channel of the barrier members and an extend portion received within an open end the cavity of the seal so as to close the open end of the cavity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
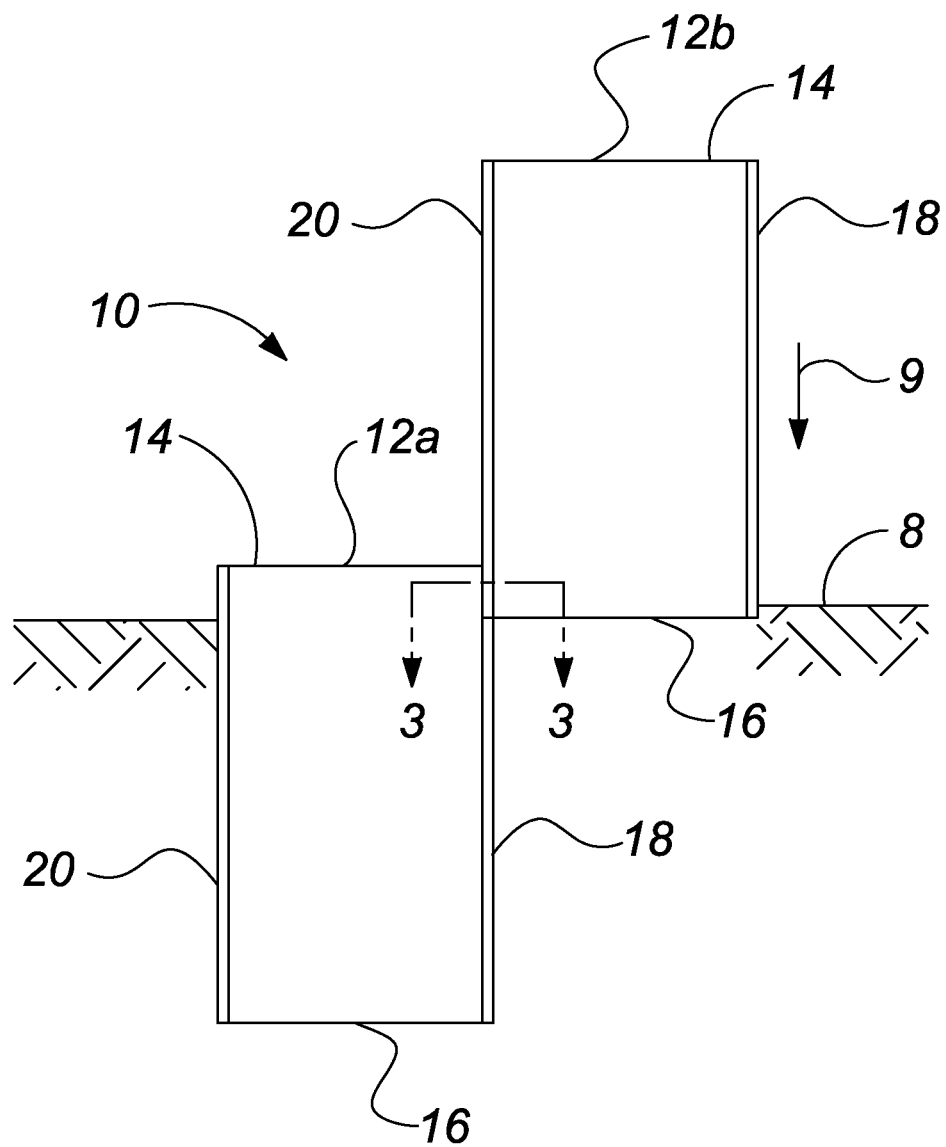
FIG. 1 is a front elevation view of a barrier wall being formed in a soil formation utilizing interlocking barrier members according to a first embodiment of the present invention.

Referring to FIG. 1, a barrier wall is shown generally at 10 being formed in a soil formation 8. The barrier wall 10 comprises a plurality of barrier members 12 inserted into the soil formation 8 adjacent to and interlocked with each other so as to form a continuous barrier wall 10. The barrier wall 10 may, by way of non-limiting example be a sheet piling wall wherein the barrier members comprise impermeable sheets. Barrier members 12, such as barrier piling sheets, for use in forming barrier walls in soil formation 8 are known in the art. Methods of inserting such barrier member are also known in the art, such as, by way of non-limiting example, by utilizing known pile driver methods such as drop hammers, vibratory hammers or plate tampers and excavators, utilizing a mandrel or digging a trench to receive the barrier members 12. As illustrated in FIG. 1, the barrier wall 10 may be formed by inserting a first barrier member 12a into the soil formation and thereafter inserting a second barrier member 12b adjacent to and slidably interlocked with the first barrier member 12a.

Figure 2:
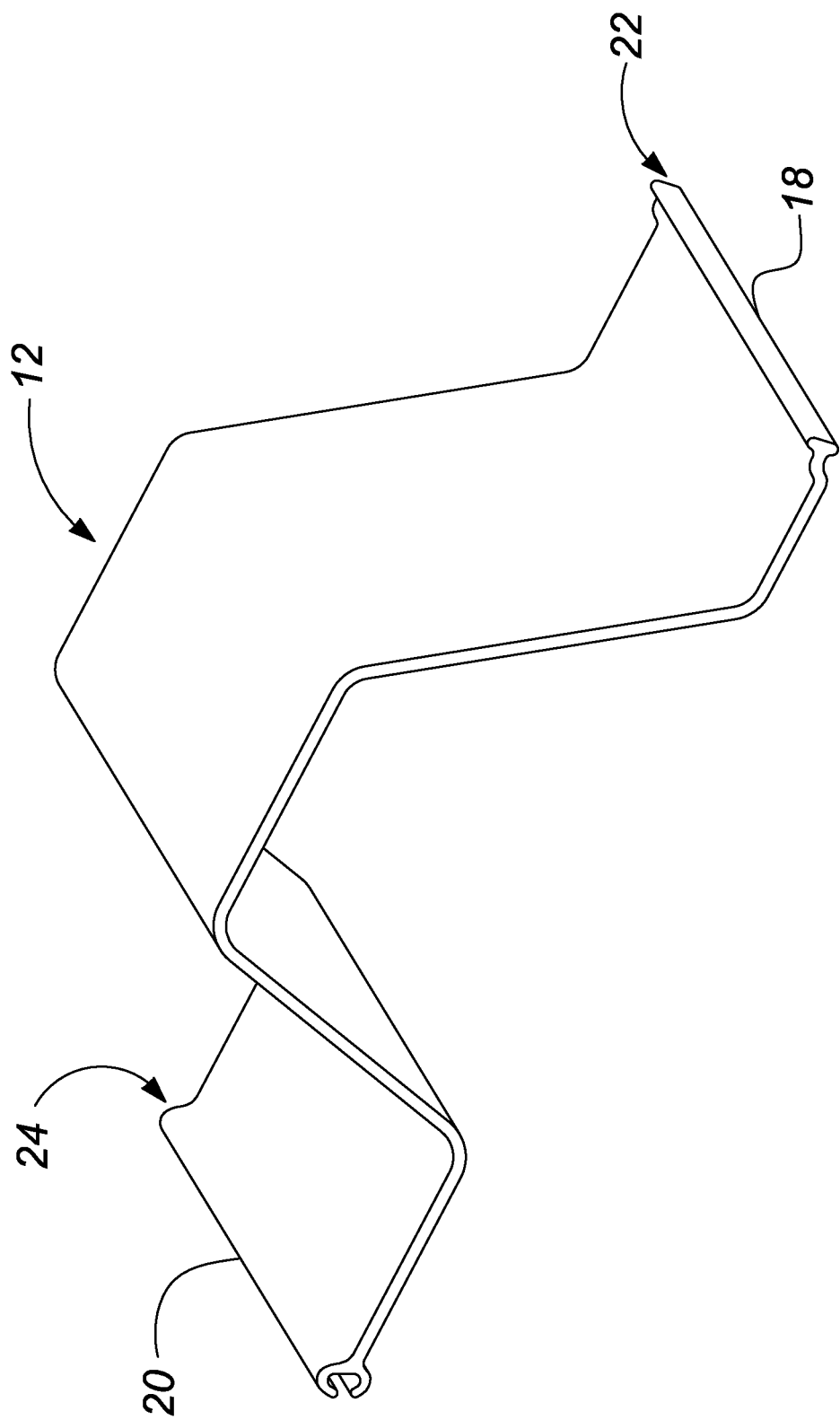
FIG. 2 is a perspective view of one of the barrier members of FIG. 1.

With reference to the first barrier member 12a, each barrier member comprises a body having a substantially rectangular outline defined by top 14, bottom 16 and first and second side edges, 18 and 20, respectively. As illustrated in FIG. 2, the barrier member 12 may comprise a sheet of material having a variety of cross section profiles as are commonly known in the art. For example, by way of non-limited example, the barrier member 12 may have a substantially planar, z-shaped, a double z-shape, u-shaped or c-shaped cross section profile. As illustrated in FIG. 1, the top and bottom edges 14 and 16 are substantially parallel to each other. Furthermore, the first and second side edges 18 and 20 are substantially parallel to each other and substantially perpendicular to the top and bottom edges. The first edge 18 has a first connector 22 disposed therealong while the second edge 20 has a second connector 24 disposed therealong. As further described below, the first and second connectors 22 and 24, are adapted to cooperate with corresponding first and second connectors of adjacent panels. The barrier members 12 may be formed of any known material in the art. Barrier members may be formed of metal, such as steel or aluminium, resins such as vinyl, polyvinyl chloride (PVC) or other known plastics, or composite materials such as fibreglass or carbon fibre by way of non-limiting example.

Figure 3:
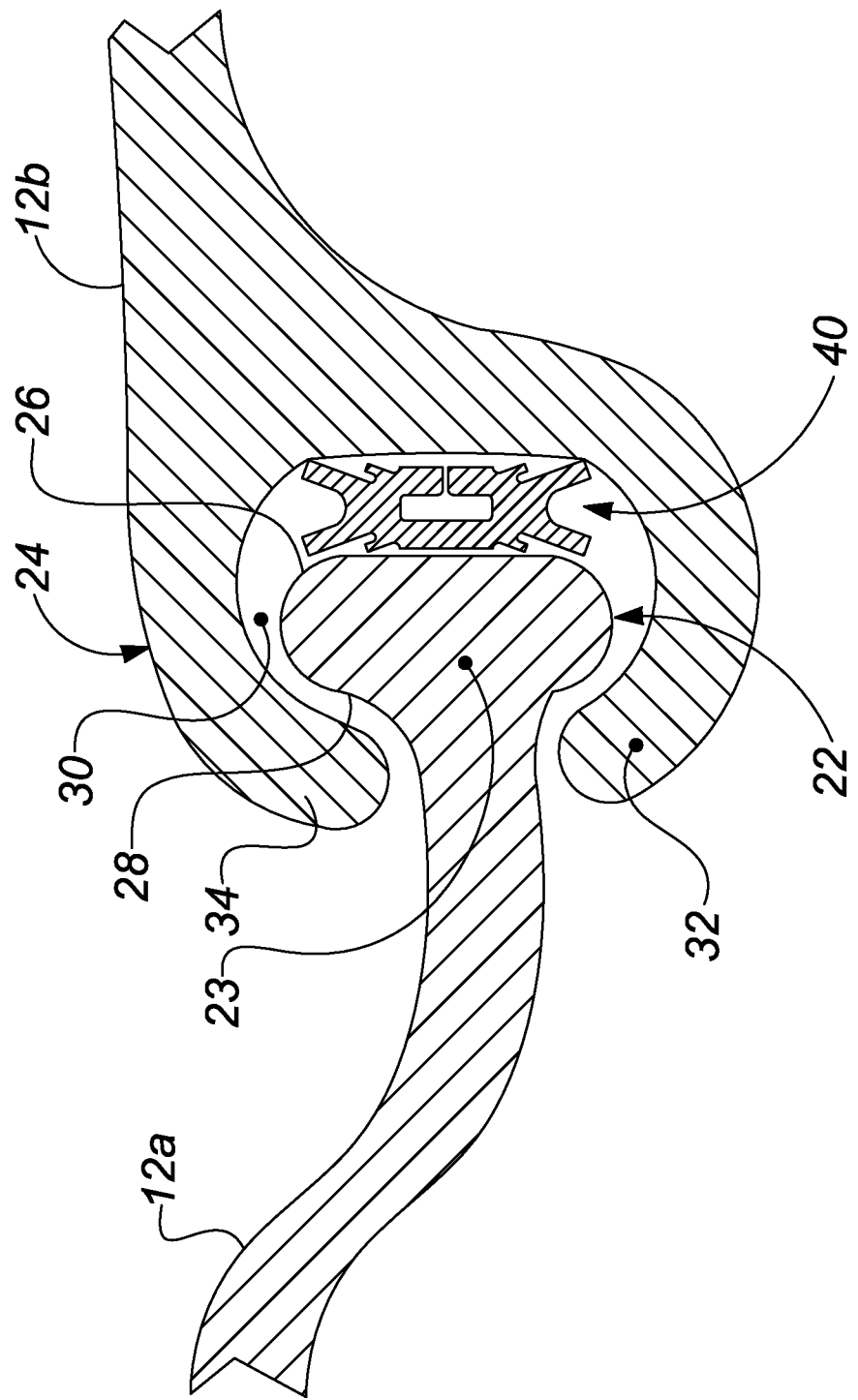
FIG. 3 is a cross-sectional view of the connection of the first and second barrier members as taken along the line 3-3 having a seal therebetween.

Turning now to FIG. 3, a cross-sectional view of a connection between adjacent first and second barrier members 12a and 12b is illustrated. As illustrated, the first connector 22 of the second barrier member 12b is interlocked with the second connector 24 of the first barrier member 12a. In the embodiment illustrated in FIG. 3, the first connector 22 comprises an elongate flange 23 extending along the length of the first edge 18 of the barrier member. The flange 23 of the first connector 22 has front and rear surfaces, 26 and 28, respectively. The second connector 24 comprises a c-shaped channel 30 extending along the second edge 20. The c-shaped channel 30 is defined by first and second opposed partitions, 32 and 34, respectively adapted to surround the flange 23 and bear against the rear surface 28 of the first connector so as to retain the flange within the c-shaped channel 30.

Figure 4:
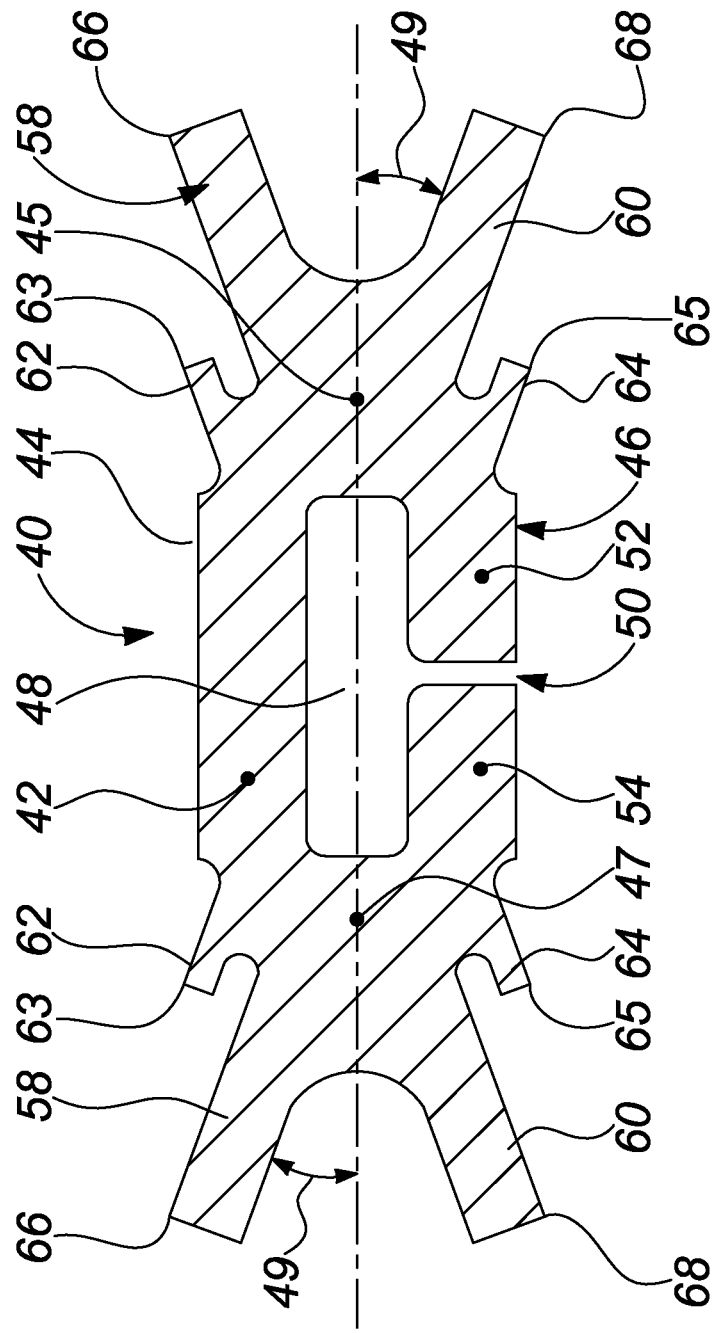
FIG. 4 is a cross-sectional view of the seal of FIG. 3.

Disposed between the front surface 26 and the end of the c-shaped channel 30 is a seal 40 according to a first embodiment of the present invention. As illustrated in FIG. 4, the seal 40 comprises an elongate member begin formed of a central elongate core 42 and a plurality of flexible fins extending therefrom as will be further described below. The central core 42 of the seal 40 comprises a substantially rectangular cross section between first or front and second or rear surfaces, 44 and 46, respectively, and first and second sides 45 and 47, respectively, and having a central cavity 48 therein. A slot 50 extends from the central cavity 48 to the rear surface so as to form first and second side arms 52 and 54 to either side of the slot 50. The central cavity 48 is sized to receive a sensor or the like therein and the slot 50 provides a means to introduce the sensor and its associated wire into the central cavity 48. The slot 50 may have any width or gap distance therebetween as desired by a user, such as, by way of non-limiting example up to ⅛ of an inch (3 mm). In optional embodiments, the central cavity may be omitted to provide only a slot within the central core 42. As described herein, the central cavity 48 and slot 50 may be referred to collectively or individually as an opening in the elongate core. Although the central core is illustrated as being substantially rectangular in shape, it will be appreciated that other cross sectional shapes may also be utilized, such as by way of non-limiting example circular, oval, square octagonal or irregular.

The seal 40 includes a plurality of larger or primary fins 58 and 60 and a plurality of smaller or secondary fins 62 and 64 extending from the central core 42. The primary fins may either be leading primary fins 58 located proximate to the front surface 44 of the central core or trailing primary fins 60 and located proximate to the rear surface 46 of the central core. The primary fins 58 and 60 may be substantially rectangularly shaped fins extending the length of the seal and provide the first barrier for fluid attempting to pass through the connection of the first and second barrier connections. The primary fins 58 and 60 may have a base spaced back from their respective front and rear surfaces 44 and 46 and are angled towards their respective front and rear surfaces 44 and 46 such that distal ends thereof, 66 and 68, respectively extend past the front and rear surface 44 and 46. As illustrated in FIG. 4, each primary fin has an associated secondary fin to form a set at each corner of the central core 42. Each set of fins may extend angularly from the central core by an angle, generally indicated at 49. The angle 49 may vary depending upon the needs of the user, and in particular may be selected to be between 0 and 30 degrees. In such a way, the distal ends 66 and 68 of the primary fins 58 and 60 will be the first portion of the seal 40 to make contact with either the c-shaped channel 30 or the front surface 26 of the first connector 22. Therefore when applied therebetween, the primary fins 58 and 60 will be biased towards each other thereby increasing their sealing ability between the first and second connectors 22 and 24. By way of non-limiting example, in practice, it has been found that for a seal having a central portion having a width of approximately 0.23 inches, a width of between ⅛ and ½ inches (6 to 12 mm) between the distal ends 66 and 68 has been adequate although it will be appreciated that other widths and angles may be useful as well. For such embodiments, it has also been found that an overall length of approximately 1.2 to 1 inches (12 to 25 mm) has been useful as well, by way of non-limiting example although it will be appreciated that other dimensions may also be useful depending upon the application and size of the first and second connectors 22 and 24.

The secondary fins may either be leading secondary fins 62 located proximate to the front surface 44 of the central core or trailing secondary fins 64 and located proximate to the rear surface 46 of the central core. The secondary fins 62 and 64 may be substantially rectangularly shaped fins extending the length of the seal and provide the second barrier for fluid attempting to pass through the connection of the first and second barrier connections. In other words, the secondary fins 62 and 64 provide a further seal for any fluid which may pass the primary fins 58 and 60. The secondary fins 62 and 64 may have a base spaced back from their respective front and rear surfaces 44 and 46 and are angled towards their respective front and rear surfaces 44 and 46 such that distal ends thereof, 63 and 65, respectively extend past the front and rear surface 44 and 46. In such a way, the distal ends 63 and 65 of the secondary fins 62 and 64 will be the second portion of the seal 40 to make contact with either the c-shaped channel 30 or the front surface 26 of the first connector 22. Therefore when applied therebetween, the secondary fins 62 and 64 will be biased towards each other thereby increasing their sealing ability between the first and second connectors 22 and 24. By way of non-limiting example, in practice, it has been found that for a seal having a central portion having a width of approximately 0.23 inches, a width of approximately 0.25 inches between the distal ends 63 and 65 with an angle of between 10 and 30 degrees relative to the front and rear surfaces 44 and 46 has been adequate although it will be appreciated that other widths and angles may be useful as well.

The seal 40 may be formed of any known useful sealing material, such as, by way of non-limiting example, natural and synthetic rubbers, silicon or urethane, such as, by way of non-limiting example, Viton® sold by DuPont®. It will be appreciated that the process for forming the seal 40 may be selected from extrusion, moulding or machining. In operation, an adhesive, such as by way of non-limiting example, two sided tape, glue or the like may be applied to the rear surface 46 of the seal which is thereafter inserted into the c-shaped channel 30 of the second connector 24. The seal 40 is preferably centred within the c-shaped channel 30 such that each of the leading primary and secondary fins 58 and 62 is equally engaged upon the flange 23 of the first connector 22. Thereafter the seal may be pressed thereupon so as to ensure that the adhesive is properly set and cured prior to installation of the second connector 24 on a corresponding first connector.

Figure 5:
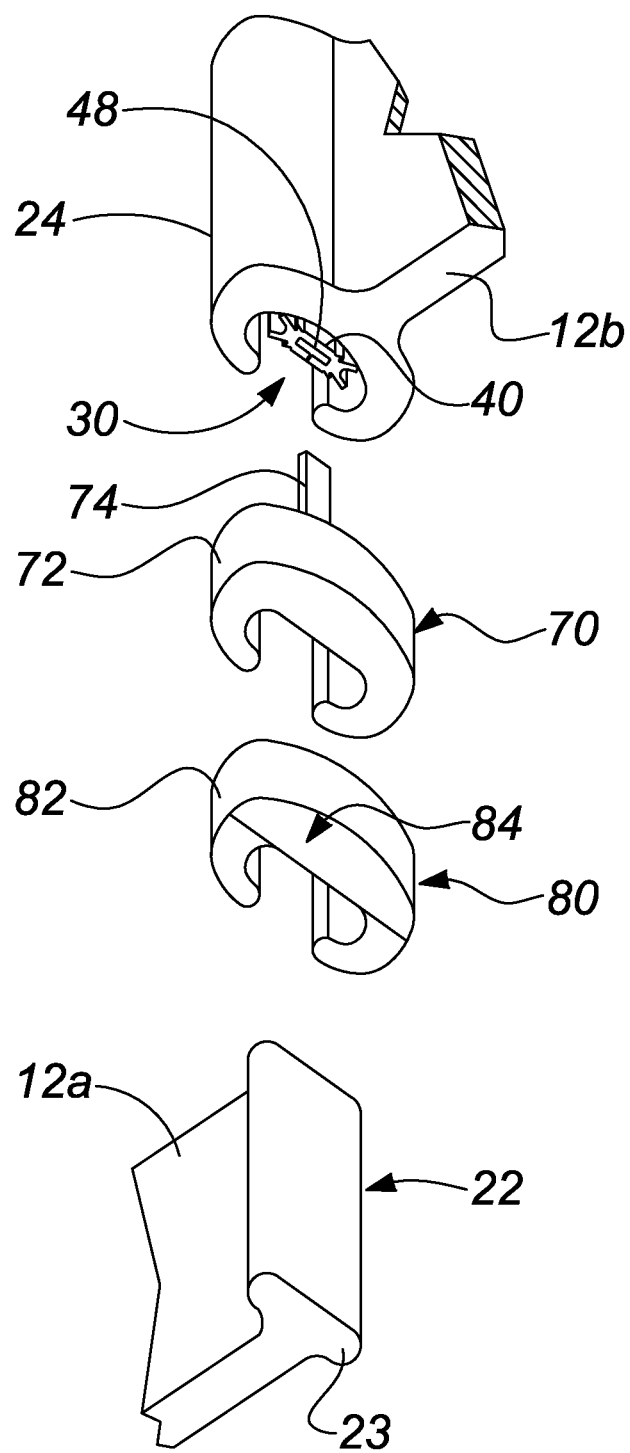
FIG. 5 is a perspective view of the assembly of a system for installing the second barrier member onto the first barrier member of FIG. 1.
Figure 6:
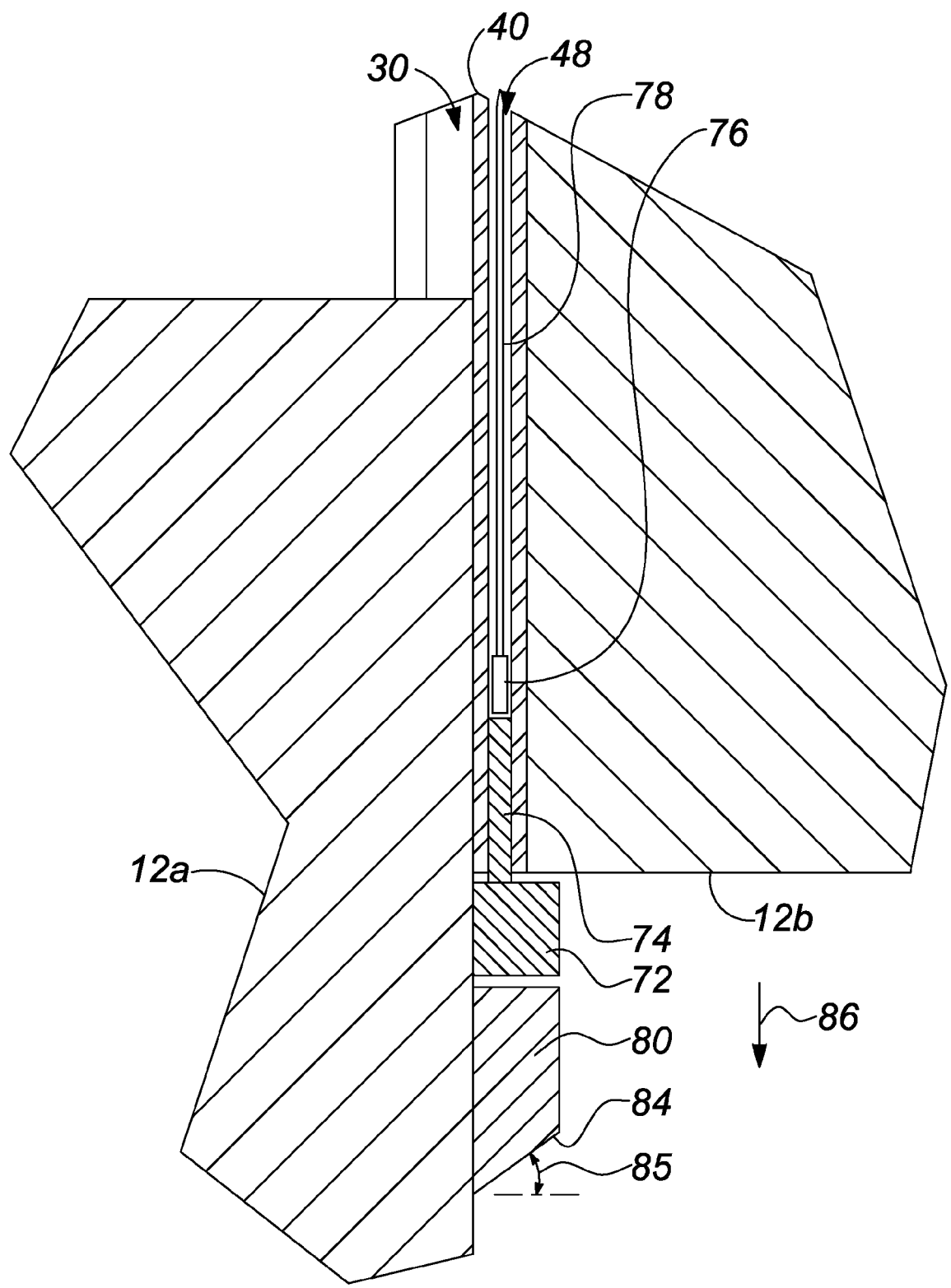
FIG. 6 is a cross sectional view of the assembly of the system of FIG. 5 as taken along the line 6-6.

With reference to FIGS. 5 and 6, a system for installing a second panel 12b on a first panel 12a is illustrated. The second panel 12b includes the c-shaped channel 30 with a seal 40 as described above installed therein. The first panel 12a includes the flange 23 to receive the c-shaped channel 30. The system includes a wiper 80 and optionally an end protector 70. As described above, the seal 40 includes a central cavity 48 with may contain a sensor or the like therein. It will be appreciated that during installation of the second panel 12b, dirt and the like may be pressed into the end of the central cavity 48 so as to damage or otherwise displace the sensor. The optional end protector prevents such debris from impacting and therefore damaging or displacing the sensor. The end protector 70 comprises a ring portion 72 adapted to closely surround the flange 23 and an extended rod 74. The extended rod 74 has a cross section and location selected to correspond to the central cavity. In operation the extended rod 74 is inserted into the central cavity after a sensor 76 and its associated wire 78 are located therein and sealed within the c-shaped channel 30. Thereafter the ring portion 72 is engaged upon a bottom edge of the second barrier member 12b so as to seal and protect the open end of the central cavity 48. Optionally, the extended rod 74 may be omitted. The wiper 80 comprises a body 82 sized and shaped to closely surround the flange 23 having a bottom edge 84. The bottom edge 84 may be substantially perpendicular to the flange or may be angled at a leading angle, generally indicated at 85 in FIG. 6. The leading angle may be selected to assist in insertion of the wiper 80 into the soil formation 8 and may have an angle of up to 60 degrees by way of non-limiting example. In operation, the wiper 80 place over the flange 23 below the sensor protector 70 so as to remove dirt, debris and the like from adjacent to the flange and thereby to prevent it from infiltrating into the connection between the first and second connectors 22 and 24 as the second panel 12b, sensor protector 70 and wiper 80 are inserted into a soil formation in a direction generally indicated at 86.

Figure 7:
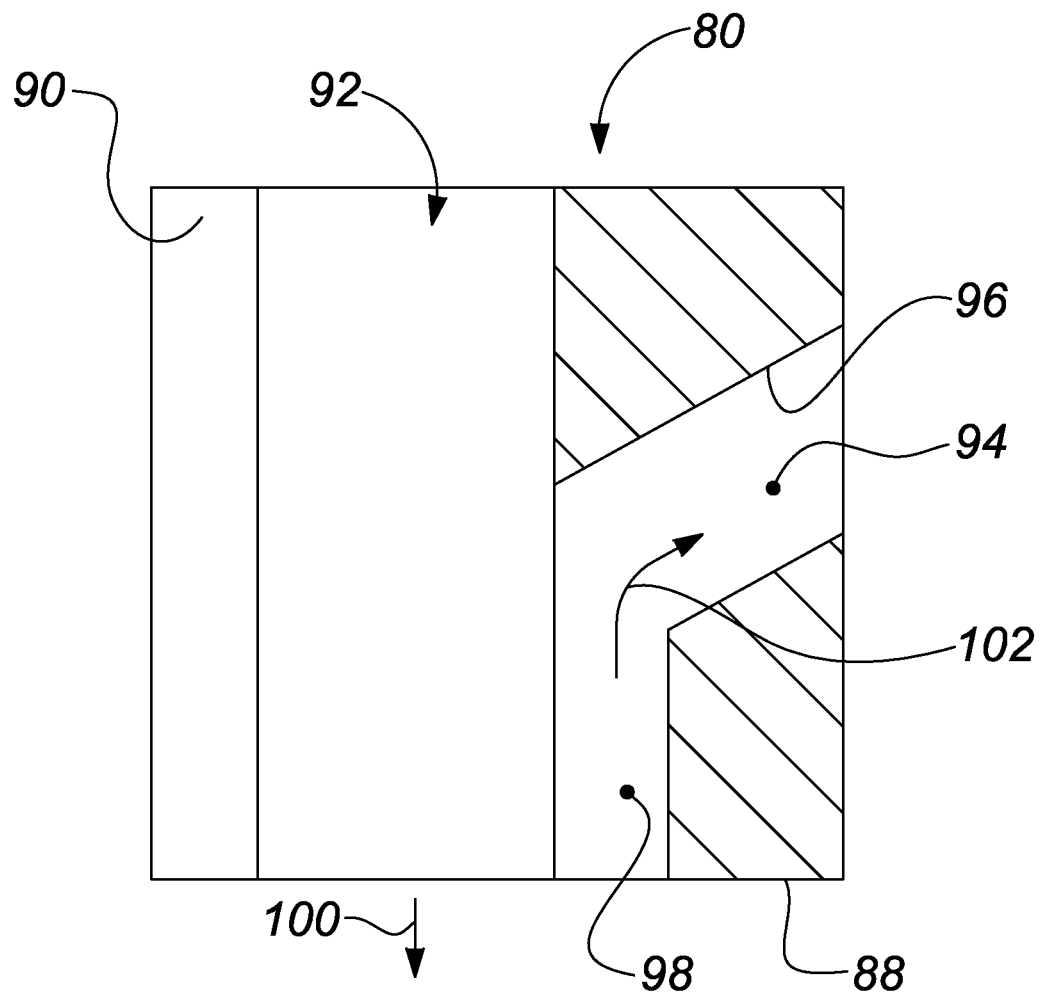
FIG. 7 is a cross sectional view of an alternative wiper according to a further embodiment of the present invention.

Turning now to FIG. 7, an alternative embodiment of the wiper 80 is illustrated having a perpendicular bottom edge 88. The wiper includes arms 90 adapted to closely surround the flange 23 within a cavity 92 as described above. The wiper 80 includes an angular passage 94 extending from the cavity 92 to an exterior of the wiper. The angular passage is formed by an angular interior wall 96 as illustrated. The angular passage 94 intersects with a notch 98 along an edge of the cavity 92. In operation as the wiper 80 is moved in a downward direction along the flange 23, generally indicated at 100, material proximate to the flange is guided through the notch 98 and out of the angular passage 94 away from the flange in a direction generally indicated at 102.

While specific embodiments of the invention have been described and illustrated, such embodiments should be considered illustrative of the invention only and not as limiting the invention as construed in accordance with the accompanying claims.

What is claimed is:

1. A seal for sealing an elongate member within an elongate channel, the seal comprising:
    an elongate core having an opening extending longitudinally therealong, said elongate core having a substantially rectangular cross-section having four corners; and
    a plurality of fins extending longitudinally from said elongate core, wherein said plurality of fins comprises a pair of fins proximate to each corner of said rectangular cross-section of said elongate core, each of said pair of fins comprising at least one long fin and at least one short fin extending from said elongate core separated by a slot, wherein said long fin and said short fin are operable to be independently flexible of each other.

2. The seal of claim 1 wherein said opening comprises a central cavity extending along a central axis of said elongate core connected to an exterior of said elongate core by a slot.

3. The seal of claim 1 wherein said plurality of fins extend substantially radially from said elongate core.

4. The seal of claim 1 wherein said elongate core is substantially defined by first and second long sides having first and second short sides extending therebetween.

5. The seal of claim 1 wherein said long fins extend from said short sides proximate to said short fins.

6. The seal of claim 5 wherein said long and short fins extend angularly from said elongate core.

7. The seal of claim 5 wherein each long fin has a corresponding short fin.

8. The seal of claim 7 wherein each long fin extends from said central core substantially parallel to its corresponding short fin.

9. The seal of claim 1 wherein said seal is formed of a substantially flexible material.

10. A system for sealing a connection between adjacent barrier members, each barrier member having a first edge defining a channel and an opposed second edge defining a flange, the flange being sized and shaped to be slidably engaged within a corresponding channel of an adjacent barrier member, the system comprising:
    a seal for sealing said flange within said channel, said seal comprising:
        an elongate core having an opening extending longitudinally therealong; and
        a plurality of fins extending longitudinally from said elongate core; and
    a wiper sized to slidably and sealably surround said flange proximate to a bottom edge of said channel having a top edge abuttable against said channel for removing debris from adjacent to said flange.

11. The system of claim 10 further including an edge protector comprising a body having a shape corresponding to said channel of said barrier members being locatable between said channel and said wiper and having an extend portion sized and located to be received within an open end said cavity of said seal located within said channel so as to close said open end of said cavity.

12. A method of sealing interconnections between adjacent panel members in a barrier, each barrier member having a first edge defining a channel and an opposed second edge defining a flange, the flange being sized and shaped to be slidably engaged within a corresponding channel of an adjacent barrier member, the method comprising:
    locating a first barrier member within a soil formation;
    slidably and sealably locating a wiper about said flange of said first barrier member;
    applying a seal within said channel of a second barrier member, said seal comprising an elongate core having an opening extending longitudinally therealong and a plurality of fins extending longitudinally from said elongate core;
    engaging said channel of said second barrier member with said flange of said first barrier member; and
    moving said second barrier member in a downward direction with said wiper below said channel of said second barrier member so as to remove and prevent debris from entering the connection between said channel and said flange.

13. The method of claim 12 further comprising locating an edge protector between said wiper and said channel of said second barrier member, said edge protector comprising a body having a shape corresponding to said channel of said barrier members and an extend portion received within an open end said cavity of said seal so as to close said open end of said cavity.

* * * * *